United States Patent
Leger et al.

(10) Patent No.: US 11,529,665 B2
(45) Date of Patent: *Dec. 20, 2022

(54) SWAGE MACHINE HINGE SYSTEMS AND METHODS

(71) Applicant: Trinity Bay Equipment Holdings, LLC, Houston, TX (US)

(72) Inventors: John Paul Leger, Baytown, TX (US); Dale Brian Marietta, Katy, TX (US)

(73) Assignee: Trinity Bay Equipment Holdings, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/402,692

(22) Filed: Aug. 16, 2021

(65) Prior Publication Data

US 2022/0105555 A1   Apr. 7, 2022

Related U.S. Application Data

(63) Continuation of application No. 17/061,779, filed on Oct. 2, 2020, now Pat. No. 11,090,708.

(51) Int. Cl.
| | | |
|---|---|---|
| *B21D 39/04* | (2006.01) | |
| *F16L 13/14* | (2006.01) | |
| *B23P 19/04* | (2006.01) | |
| *B21D 37/06* | (2006.01) | |
| *B23P 19/02* | (2006.01) | |

(52) U.S. Cl.
CPC ......... *B21D 39/046* (2013.01); *B21D 39/048* (2013.01); *F16L 13/146* (2013.01); *B21D 37/06* (2013.01); *B23P 19/02* (2013.01); *B23P 19/04* (2013.01)

(58) Field of Classification Search
CPC .... B21D 39/046; B21D 39/048; B21D 37/06; B23P 19/02; B23P 19/04
See application file for complete search history.

(56) References Cited

U.S. PATENT DOCUMENTS

| | | |
|---|---|---|
| 6,324,884 B1 | 12/2001 | Barjesteh et al. |
| 6,840,433 B2 | 1/2005 | Vermaat |
| 8,336,117 B2 | 12/2012 | Carter et al. |
| 8,782,863 B2 | 7/2014 | Pfeiffer |
| 8,904,848 B2 | 12/2014 | Frenken |
| 11,090,708 B1* | 8/2021 | Leger .................. B21D 39/048 |
| 2010/0229368 A1 | 9/2010 | Frenken et al. |
| 2013/0025101 A1 | 1/2013 | Pfeiffer |
| 2014/0259597 A1 | 9/2014 | LaValley et al. |

* cited by examiner

*Primary Examiner* — Jermie E Cozart
(74) *Attorney, Agent, or Firm* — Conrad J. Hsu

(57) ABSTRACT

Techniques for implementing and/or operating a system that includes a pipe fitting and a swage machine. The swage machine includes a grab plate having a grab tab that matingly interlocks with a grab notch on the pipe fitting to facilitate securing the swage machine to the pipe fitting and a die plate having a die seat that enables a set of die segments to be used to conformally deform the pipe fitting around the tubing of the pipe segment to be loaded in the swage machine. The die plate and the grab plate include a base plate section, a hinge plate secured to the base plate section via a hinge fastener such that the hinge plate directly abuts the base plate section, and a pivotable plate section secured to the hinge plate via a hinge fastener such that the hinge plate directly abuts the pivotable plate section.

20 Claims, 8 Drawing Sheets

SWAGE MACHINE HINGE SYSTEMS AND METHODS

CROSS-REFERENCE

The present disclosure is a continuation of U.S. patent application Ser. No. 17/061,779, entitled "SWAGE MACHINE HINGE SYSTEMS AND METHODS" and filed Oct. 2, 2020, which is incorporated herein by reference in its entirety for all purposes.

BACKGROUND

The present disclosure generally relates to pipeline systems and, more particularly, to a swage machine that may implemented and/or operated to facilitate securing a pipe fitting to a pipe segment in a pipeline system.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate transporting fluid, a pipeline system may include one or more pipe segments in addition to pipe (e.g., midline and/or end) fittings, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

Additionally, in some instances, a pipe fitting may be secured to a pipe segment using special-purpose deployment equipment—namely a swage machine, which is implemented and/or operated to conformally deform at least a portion of the pipe fitting around the tubing of the pipe segment such that the portion of the pipe fitting engages the pipe segment tubing. To facilitate swaging (e.g., conformally deforming) a pipe fitting, a swage machine may generally include a grab plate, which is implemented to matingly interlock with a grab notch on the pipe fitting to facilitate securing the swage machine to the pipe fitting, a die plate, which is implemented to enable a set of die segments that is to be used to swage the pipe fitting to be loaded in the swage machine, and one or more actuators, which are implemented and/or operated to selectively move the die plate over the pipe fitting in an axial direction. Since a pipe fitting to be swaged by a swage machine may not necessarily be at an end of a pipeline system, in some instances, each plate (e.g., die plate and grab plate) of the swage machine may include one or more hinges that enable the swage machine to be selectively closed around the pipe fitting. However, a hinge in a swage machine plate is often a weak point in a swage machine, thereby potentially limiting load capacity of the swage machine and, thus, potentially the size (e.g., outer diameter) of pipe fittings for which the swage machine is suitable for swaging, for example, due to the swage machine hinge including an air gap.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes a pipe fitting, which is to be secured to a pipe segment having tubing that defines a pipe bore and a fluid conduit in a tubing annulus, and a swage machine. The swage machine includes a grab plate having a grab tab that matingly interlocks with a grab notch on the pipe fitting to facilitate securing the swage machine to the pipe fitting and a die plate having a die seat that enables a set of die segments to be used to conformally deform a portion of the pipe fitting around the tubing of the pipe segment to be loaded in the swage machine. The die plate and the grab plate include a base plate section, a hinge plate secured to the base plate section via a first hinge fastener such that the hinge plate directly abuts the base plate section, and a pivotable plate section secured to the hinge plate via a second hinge fastener such that the hinge plate directly abuts the pivotable plate section, in which the pivotable plate section rotates relative to the base plate section to facilitate transitioning the swage machine between an opened state and a closed state.

In another embodiment, a method of implementing a swage machine, includes implementing a grab plate with a grab tab that matingly interlocks with a grab notch on a pipe fitting to be swaged by the swage machine to facilitate securing the swage machine to the pipe fitting and implementing a die plate with a die seat that enables a set of die segments to be used to conformally deform a fitting jacket of the pipe fitting around pipe segment tubing to be loaded into the swage machine. In particular, implementing the die plate and implementing the grab plate includes securing a hinge plate to a base plate section via a first hinge fastener such that the hinge plate directly abuts the base plate section and securing the hinge plate to a pivotable plate section via a second hinge fastener to enable the pivotable plate section to rotate relative to the base plate section.

In another embodiment, a swage machine includes a swage machine plate. The swage machine plate includes plate sections to be disposed circumferentially around a pipe fitting and a hinge that enables a first plate section of the plate sections and a second plate section of the plate sections to rotate relative to one another to facilitate transitioning the swage machine between an opened state and a closed state. The hinge includes a hinge plate having a first fastener opening and a second fastener opening, a first hinge fastener that secures the hinge plate to the first plate section via the first fastener opening such that the hinge plate directly abuts the first plate section, and a second hinge fastener that secures the hinge plate to the second plate section via the second fastener opening such that the hinge plate directly abuts the second plate section.

DETAILED DESCRIPTION

Figure 1:
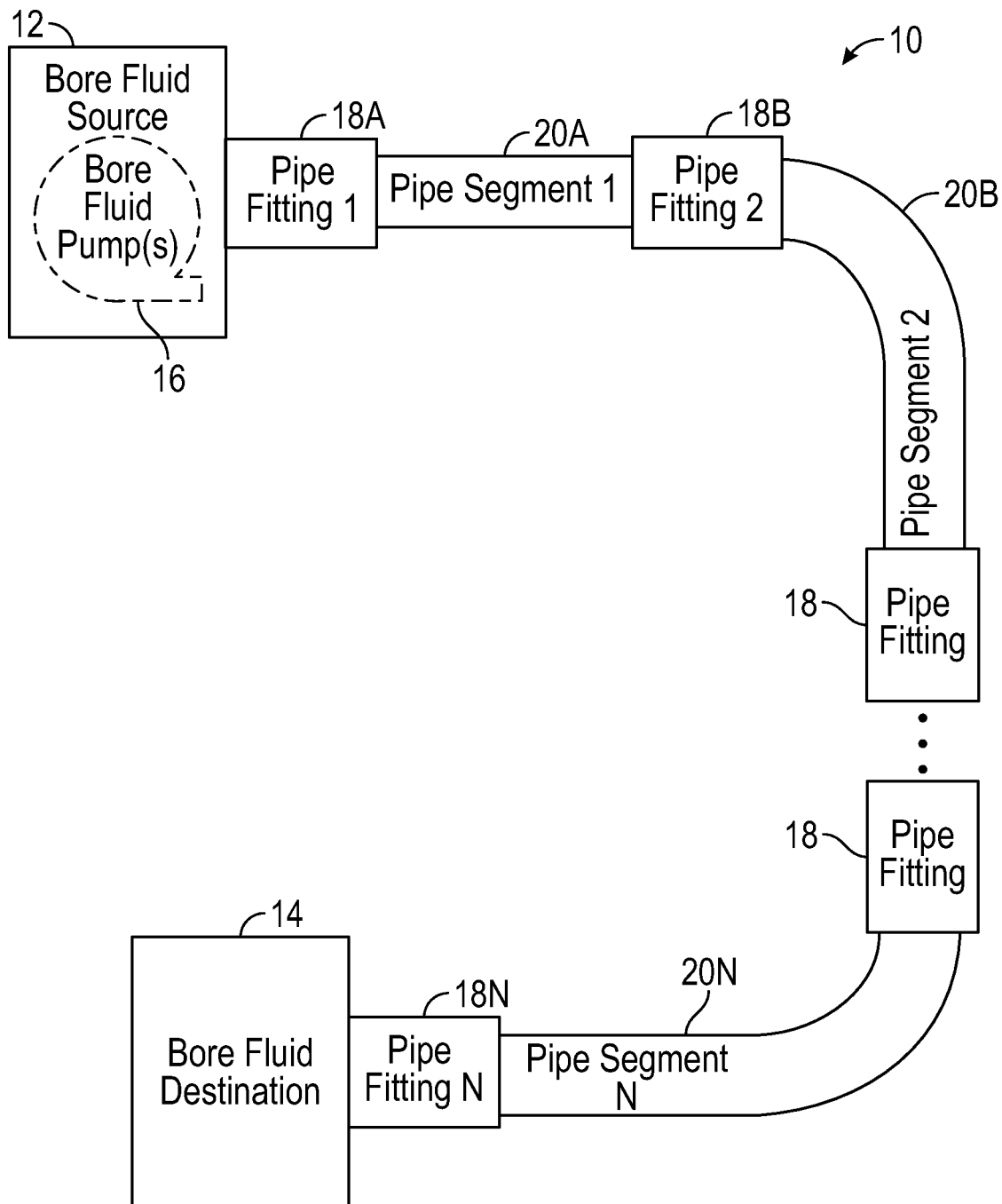
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments, which each includes tubing that defines (e.g., encloses) a corresponding pipe bore. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, to enable fluid flow therethrough, a pipe fitting may generally include a fitting bore, which is defined (e.g., enclosed) by a fitting tube. Additionally, in some instances, the pipe fitting may be secured to a pipe segment at least in part by securing the tubing of the pipe segment around the fitting tube of the pipe fitting using swaging techniques. To facilitate securing a pipe segment thereto via swaging techniques, the pipe fitting may include one or more fitting jackets implemented circumferentially around its fitting tube. When implemented in this manner, the pipe fitting may be secured to the pipe fitting via swaging techniques at least in part by disposing (e.g., inserting) the tubing of the pipe segment in a tubing cavity of the pipe fitting, which is defined (e.g., enclosed) between a corresponding fitting jacket and the fitting tube, and conformally deforming the fitting jacket around the pipe segment tubing such that an inner surface of the fitting jacket and/or an outer surface of the fitting tube engage a corresponding surface of the pipe segment tubing.

In fact, in some instances, special-purpose deployment equipment—namely a swage machine—may be implemented and/or operated to facilitate conformally deforming a fitting jacket of a pipe fitting around the tubing of a pipe segment. In particular, to facilitate conformally deforming a fitting jacket of a pipe fitting around pipe segment tubing, the swage machine may generally include a grab plate and a die plate, for example, in addition to a support plate. More specifically, the grab plate of the swage machine may include grab tab, which is implemented (e.g., sized and/or shaped) to matingly interlock (e.g., engage and/or interface) with a grab notch implemented circumferentially along an outer surface of the pipe fitting to facilitate securing the swage machine to the pipe fitting. Additionally, the die plate of the swage machine may be implemented to enable a set of die segments to be loaded therein such that the set of die segments deforms a fitting jacket of the pipe fitting circumferentially in a radial inward direction when passed over the fitting jacket in an axial direction, for example, due to operation of one or more swaging actuators. In other words, to facilitate swaging a pipe fitting, at least the die plate and the grab plate of a swage machine may be disposed circumferentially around the pipe fitting.

Since a pipe fitting to be swaged may not necessarily be at an end of a pipeline system, plates (e.g., die plate, grab plate, and/or support plate) of a swage machine may be implemented to selectively transition between an opened state, which enables the swage machine to be deployed at or removed from the pipe fitting, and a closed state, which enables the swage machine to swage the pipe fitting. To facilitate transitioning between its opened state and its closed state, a swage machine plate may include a base plate section and one or more pivotable plate sections, which are each implemented to rotate (e.g., pivot) relative to the base plate section. To enable pivoting, each pivotable plate section may be connected to the base plate section via a corresponding hinge. However, a hinge in a swage machine plate is often a weak point in a swage machine, thereby potentially limiting load capacity of the swage machine and, thus, potentially the size (e.g., outer diameter) of pipe fittings for which the swage machine is suitable for swaging, for example, due to the swage machine hinge including an air gap.

Accordingly, to facilitate improving swage machine load capacity, the present disclosure provides techniques for implementing a swage machine with improved hinge strength, for example, to enable the swage machine to be suitable for swaging large diameter (e.g., eight inch, ten inches, or larger) pipe fittings. To facilitate improving hinge strength, as will be described in more detail below, a hinge in a swage machine plate (e.g., die plate, grab plate, and/or support plate) may generally include one or more hinge plates, which are each implemented to secured to a base plate section of the swage machine plate and a corresponding pivotable plate section of the swage machine plate via multiple fasteners. For example, a swage machine hinge may include a (e.g., first) hinge plate, which is implemented to be secured to first (e.g., outward-facing) sides of a base plate section and a corresponding pivotable plate section. To facilitate further improving hinge strength, in some embodiments, the swage machine hinge may additionally include a second hinge plate, which is implemented to be secured to second (e.g., inward-facing and/or opposite) sides of the base plate section and the corresponding pivotable plate section.

In any case, in some embodiments, the fasteners in a swage machine hinge may include bolts and/or screws. As such, to facilitate securing a hinge plate to corresponding plate sections via hinge fasteners, the hinge plate and the plate sections may each include one or more fastener openings (e.g., holes). In particular, to facilitate securing a hinge plate to a base plate section of a swage machine plate, the hinge plate may include a first fastener opening, which is implemented to align with a fastener opening implemented in the base plate section. To facilitate securing the hinge plate to a pivotable plate section of the swage machine plate, the hinge machine plate may additionally include a second fastener opening, which is implemented to align with a fastener opening implemented in the pivotable plate section.

In other words, as will be described in more detail below, a swage machine plate (e.g., die plate, grab plate, and/or support plate) in a swage machine may generally be implemented at least in part by implementing a base plate section with a fastener opening, implementing one or more pivotable plate sections each with a fastener opening, and implementing one or more hinge plates each with multiple fastener openings. A swage machine hinge may then be implemented at least in part by aligning a first faster fastener opening in a (e.g., first) hinge plate with the fastener opening in the base plate section, securing a first hinge fastener in the first hinge plate fastener opening and the base section fastener opening, aligning a second fastener opening in the hinge plate with the fastener opening in a pivotable plate section, and securing a second hinge fastener in the second hinge plate fastener opening and the pivotable section fastener opening. To facilitate improving hinge strength, in some embodiments, a second hinge plate may also be secured to an opposite side of the base plate section via the first hinge fastener and to an opposite side of the pivotable plate section via the second hinge fastener. In any case, implementing a swage machine plate in this manner may enable each pivotable plate section in the swage machine plate to rotate (e.g., pivot) relative to the base plate section of the swage machine plate and, thus, enable the swage machine plate to be selectively transitioned between its opened state and its closed state, for example, due to a hinge plate rotating relative to the base plate section and/or a pivotable plate section rotating relative to the hinge plate.

However, to facilitate improving control over the transition of a swage machine plate between its opened state and its closed state, in some embodiments, one or more plate sections of the swage machine plate may be implemented to limit rotation of a corresponding hinge plate relative thereto. For example, in some such embodiments, the base plate section of a swage machine plate may be implemented to block rotation of a hinge plate relative thereto, thereby resulting in a corresponding pivotable plate section of the swage machine plate rotating relative to the base plate section due solely to rotation of the pivotable plate section relative to the hinge plate. Additionally or alternatively, although a hinge plate is allowed to rotate relative thereto, a pivotable plate section of a swage machine plate may be implemented to limit rotation to a specific range.

To facilitate limiting rotation of a hinge plate relative a plate section of a swage machine plate, in some embodiments, a hinge plate recess may be implemented in the plate section, for example, such that the hinge plate recess surrounds a corresponding fastener opening in the plate section and, thus, may also facilitate aligning a fastener opening in the hinge plate with the plate section fastener opening. In particular, to facilitate limiting rotation of a hinge plate to a specific range, in some embodiments, a hinge plate recess in a (e.g., pivotable) plate section of a swage machine plate may be implemented such that the shape of a first side of the hinge plate recess generally matches the shape of a first side of a corresponding end of the hinge plate when the hinge plate is at one end of the specific rotation range and the shape of a second (e.g., opposite) side of the hinge plate recess generally matches the shape of a second (e.g., opposite) side of the corresponding end of the hinge plate when the hinge plate is at the other end of the specific rotation range. Furthermore, to facilitate blocking rotation of a hinge plate relative thereto, in some embodiments, a hinge plate recess in a (e.g., base) plate section of a swage machine plate may be implemented such that the shape of the hinge plate recess generally matches the shape of a corresponding end of the hinge plate. Additionally or alternatively, to facilitate blocking rotation of a hinge plate relative a plate section of a swage machine plate, in some embodiments, the hinge plate may be secured to the plate section via a shear screw, for example, instead of a bolt.

In any case, a swage machine hinge implemented in a swage machine plate (e.g., grab plate, die plate, and/or support plate) in accordance with the present disclosure may facilitate improving hinge strength due at least in part to the swage machine hinge enabling a hinge plate to be secured such that it directly abuts the base plate section and a corresponding pivotable plate section of the swage machine plate. As such, the swage machine hinge may enable force (e.g., stress and/or load) exerted on the base plate section to be transferred directly to the hinge plate and vice versa while enabling force exerted on the pivotable plate section to be transferred directly to the hinge plate and vice versa. In other words, the swage machine hinge may enable force (e.g., stress and/or load) exerted on the swage machine plate to be transferred between the base plate section and the pivotable plate section via plates of solid material, for example, instead of via a pin and an air gap, and, thus, facilitates improving hinge strength.

To facilitate further improving hinge strength, in some embodiments, a hinge fastener used to secure a hinge plate to a corresponding plate section of a swage machine plate may be pre-loaded. In particular, a hinge fastener may be pre-loaded at least in part by tightening the hinge fastener beyond what is sufficient to cause the hinge plate to directly abut a corresponding plate section of a swage machine plate. In other words, pre-loading the hinge fastener may compress the hinge plate and the plate section of the swage machine plate toward one another, which, at least in some instances, may facilitate further improving hinge strength, for example, due to the compressive force further reducing any air gap between the hinge plate and the plate section of the swage machine plate. In this manner, as will be described in more detail below, the present disclosure provides techniques for implementing a swage machine with improved hinge strength, which, at least in some instances, may facilitate improving load capacity of the swage machine, for example, to facilitate making the swage machine suitable for swaging larger diameter pipe fittings in a pipeline system.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include pipe fittings 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., two or one) pipe segments 20 or more than three (e.g., four, five, or more) pipe segments 20. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more intermediate (e.g., steel strip) layers external to the first high-density polyethylene layer, and a second high-density polyethylene (e.g., external corrosion protection) layer external to the one or more intermediate layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may additionally define free space (e.g., one or more gaps) devoid of solid material within its annulus. In fact, in some embodiments, free space defined in the tubing of a pipe segment 20 may run (e.g., span) the length of the pipe segment 20 and, thus, define (e.g., enclose) a fluid conduit (e.g., free space) in the annulus of the tubing, which is separate from the pipe bore. In other words, in such embodiments, fluid may flow through a pipe segment 20 via its pipe bore, free space (e.g., gaps and/or one or more fluid conduits) defined within its tubing annulus, or both.

Figure 2:
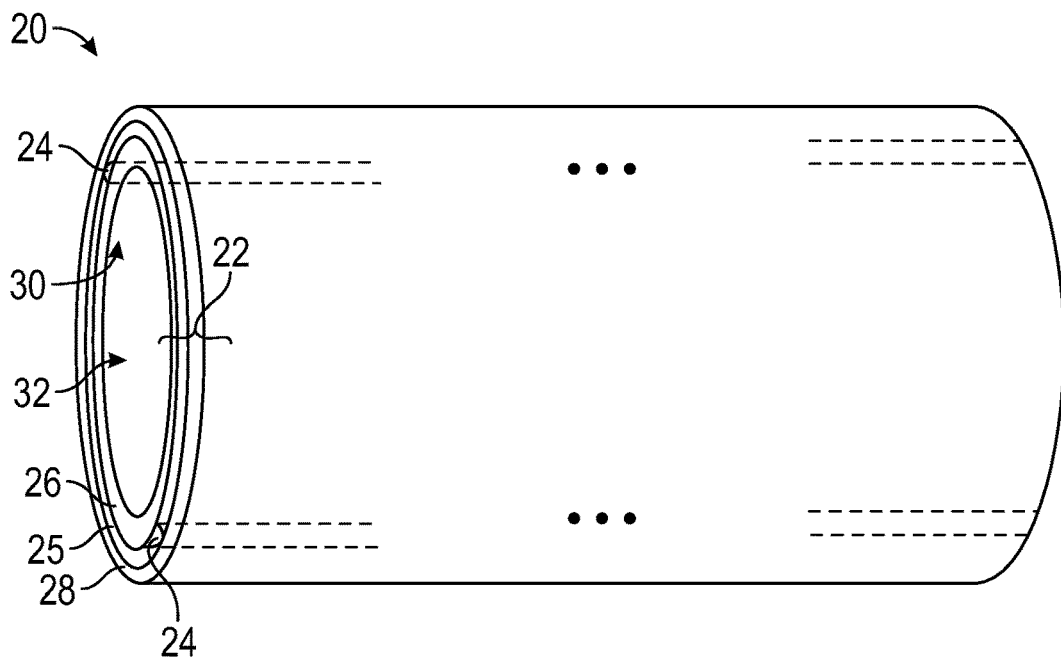
FIG. 2 is a side view of an example of a pipe segment of FIG. 1 that includes a pipe bore defined by its tubing as well as fluid conduits defined within an annulus of its tubing, in accordance with an embodiment of the present disclosure.

To help illustrate, an example of a pipe segment 20, which includes tubing 22 with fluid conduits (e.g., free space) 24 defined in its annulus 25, is shown in FIG. 2. As depicted, the pipe segment tubing 22 is implemented with multiple layers including an inner barrier (e.g., liner) layer 26 and an outer barrier (e.g., shield and/or sheath) layer 28. In some embodiments, the inner barrier layer 26 and/or the outer barrier layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner barrier layer 26 and its outer barrier layer 28. As will be described in more detail below, the tubing annulus 25 may include one or more intermediate layers of the pipe segment tubing 22. Furthermore, as depicted, fluid conduits (e.g., free space and/or gaps) 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 defined in its annulus 25 may include less solid material and, thus, exert less resistance to flexure, for example, compared to solid pipe segment tubing 22 and/or pipe segment tubing 22 that does not include fluid conduits 24 defined therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, a pipe segment 20 may include fewer than two (e.g., one) or more that two (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the longitudinal extent of the pipe bore 32 of the pipe segment 20.

Figure 3:
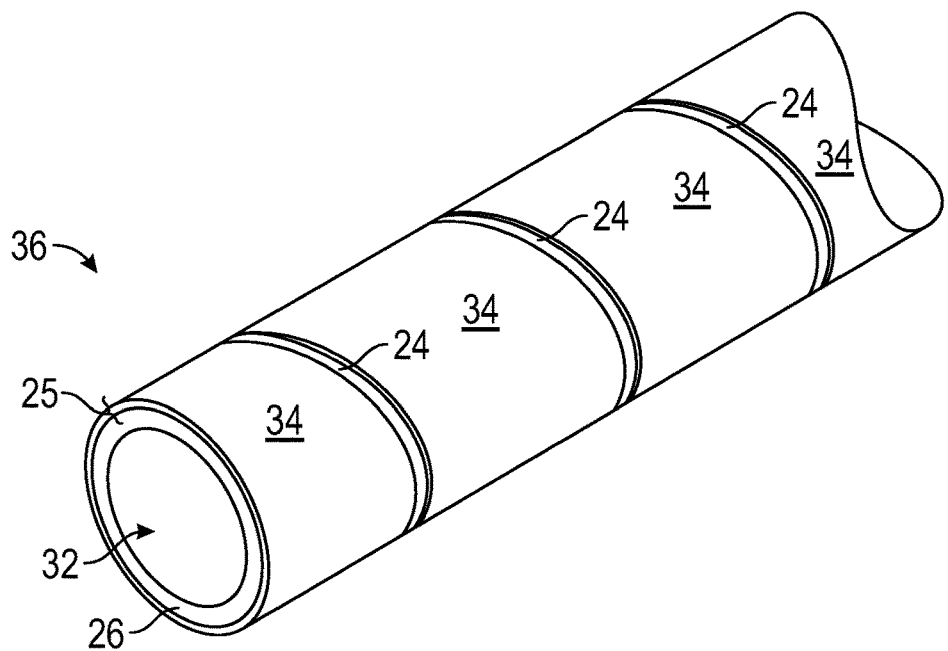
FIG. 3 is an example of a portion of the pipe segment of FIG. 2 with a helically shaped fluid conduit defined within the annulus of its tubing, in accordance with an embodiment of the present disclosure.

To help illustrate, an example of a portion 36 of a pipe segment 20, which includes an inner barrier layer 26 and an intermediate layer 34 included in the annulus 25 of its pipe segment tubing 22, is shown in FIG. 3. In some embodiments, one or more intermediate layers 34 of the pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive material, which, at least in some instances, may enable communication of electrical (e.g., sensor and/or control) signals via the intermediate layer 34.

In any case, as depicted, the intermediate layer 34 is helically disposed (e.g., wound and/or wrapped) on the inner barrier layer 26 such that free space is left between adjacent windings to define a fluid conduit 24. In other words, in some embodiments, the intermediate layer 34 may be implemented at least in part by winding a metal (e.g., steel) strip around the inner barrier layer 26 at a non-zero lay angle (e.g., fifty-four degrees) relative to the longitudinal extent of the pipe bore 32. In any case, as depicted, the resulting fluid conduit 24 runs helically along the pipe segment 20, for example, such that the fluid conduit 24 is skewed fifty-four degrees relative to the longitudinal extent of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of a pipe segment 20 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that free space is left between adjacent windings to implement one or more corresponding fluid conduits 24 in the tubing annulus 25 of the pipe segment 20.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34.

In any case, to facilitate flowing fluid from a bore fluid source 12 to a bore fluid destination 14, as described above, one or more pipe fittings 18, such as a midline pipe fitting 18 and/or a pipe end fitting 18, may be secured to a pipe segment 20. In particular, as described above, in some instances, a pipe fitting 18 may be secured to a pipe segment 20 using swaging techniques, which conformally deform a fitting jacket of the pipe fitting 18 around tubing 22 of the pipe segment 20. In fact, in some embodiments, special-purpose deployment equipment—namely a swage machine—may be implemented and/or operated to facilitate securing a pipe fitting 18 to a pipe segment 20 during deployment of a pipeline system 10.

Figure 4:
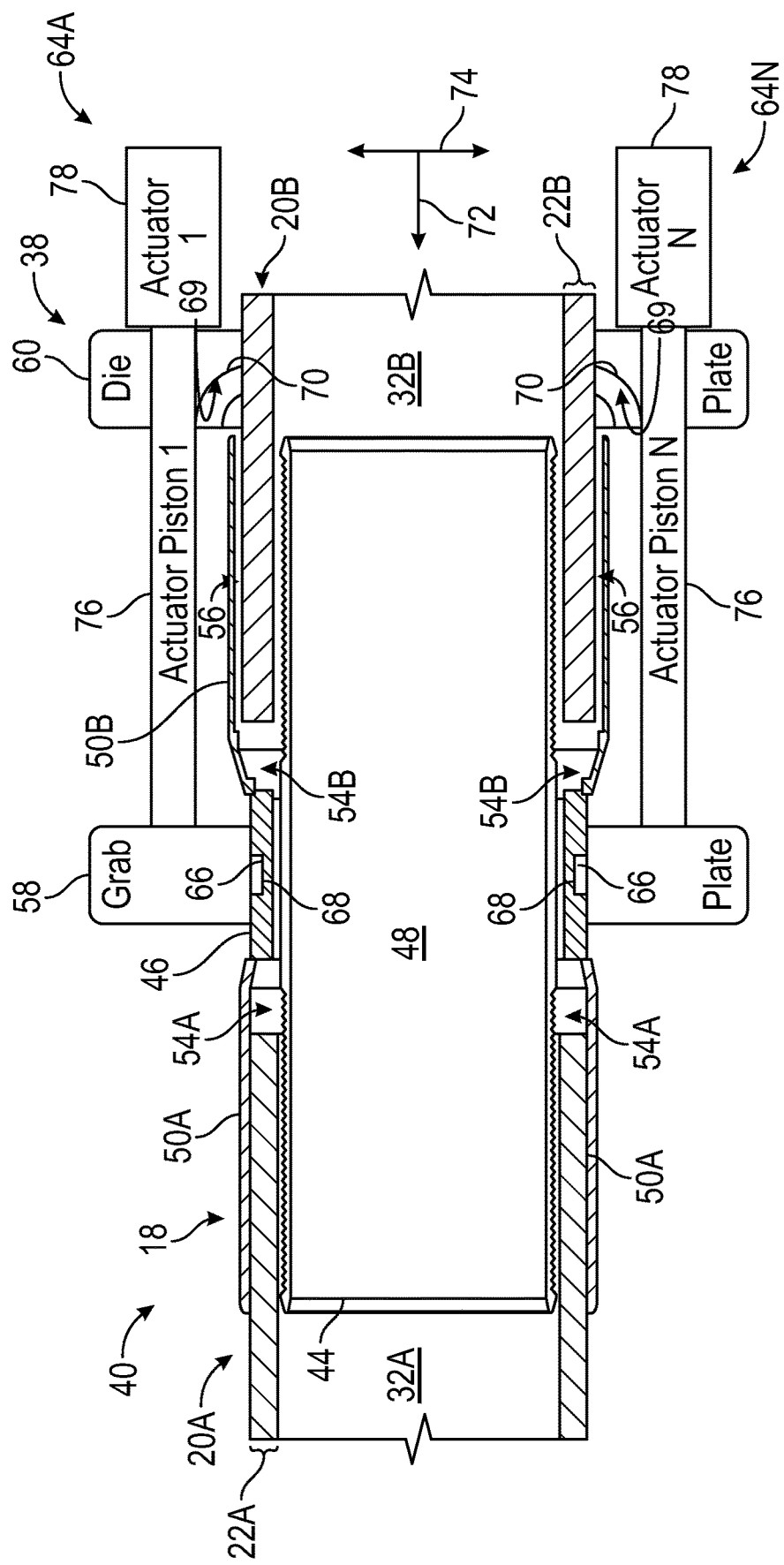
FIG. 4 is a cross-sectional view of an example of a swage machine secured to a portion of the pipeline system of FIG. 1, in accordance with an embodiment of the present disclosure.

To help illustrate, an example cross-section of a swage machine 38 and a portion 40 of a pipeline system 10 is shown in FIG. 4. As depicted, the portion 40 of the pipeline system 10 includes a first pipe segment 20A, a second pipe segment 20B, and a pipe fitting 18, which is disposed between the first pipe segment 20A and the second pipe segment 20B. Additionally, as depicted, the pipe fitting 18 includes a fitting tube 44 and a grab ring 46, which is implemented around the fitting tube 44. In particular, as depicted, the fitting tube 44 defines (e.g., encloses) a fitting bore 48, which is fluidly coupled to a first pipe bore 32A of the first pipe segment 20A and a second pipe bore 32B of the second pipe segment 20B.

In other words, the pipe fitting 18 in FIG. 4 may be a midline pipe fitting 18. However, it should be appreciated that the depicted example is merely intended to be illustrative and not limiting. In particular, in other embodiments, the techniques described in the present disclosure may additionally or alternatively be used with other types of pipe fittings 18, such as a pipe end fitting 18.

In any case, as depicted, the pipe fitting 18 includes fitting jackets 50—namely a first fitting jacket 50A and a second fitting jacket 50B—implemented circumferentially around the fitting tube 44. In particular, as depicted, first tubing 22A of the first pipe segment 20A is disposed in a first tubing cavity 54A of the pipe fitting 18, which is defined between the first fitting jacket 50A and the fitting tube 44. Similarly, second tubing 22B of the second pipe segment 20B is disposed in a second tubing cavity 54B of the pipe fitting 18, which is defined between the second fitting jacket 50B and the fitting tube 44.

However, as depicted, open space 56 is present between the second tubing 22B of the second pipe segment 20B and the second fitting jacket 50B of the pipe fitting 18 whereas minimal open space is present between the first tubing 22A of the first pipe segment 20A and the first fitting jacket 50A of the pipe fitting 18. As such, the pipe fitting 18 may exert more resistance to tubing movement in the first tubing cavity 54A and, thus, facilitate securing the pipe fitting 18 to the first pipe segment 20A. On the other hand, the pipe fitting 18 may exert less resistance to tubing movement in the second tubing cavity 54B, which, at least in some instances, may enable the second tubing 22B of the second pipe segment 20B to move relatively freely into and/or out from the second tubing cavity 54B of the pipe fitting 18. As such, to facilitate securing the pipe fitting 18 to the second pipe segment 20B, the swage machine 38 may be operated to conformally deform (e.g., swage) the second fitting jacket 50B around the second tubing 22B of the second pipe segment 20B, thereby consuming at least a portion (e.g., majority) of the open space 56.

To facilitate conformally deforming a fitting jacket 50 around pipe segment tubing 22, as depicted, the swage machine 38 includes a grab plate 58 and a die plate 60. In particular, as depicted, the grab plate 58 of the swage machine 38 includes a grab tab 66, which is implemented (e.g., sized and/or shaped) to matingly interlock (e.g., engage and/or interface) with a grab notch 68 implemented circumferentially along the grab ring 46 of the pipe fitting 18. In other words, the grab plate 58 may be implemented to facilitate securing the swage machine 38 to the pipe fitting 18.

Additionally, as depicted, the die plate 60 of the swage machine 38 includes a die seat 69, which is implemented to enable a set of die segments 70 to be loaded therein. In particular, as depicted, the set of die segments 70 is loaded into the die plate 60 such that the set die segments 70 opens toward the grab plate 58 of the swage machine 38. As such, when compressed against a fitting jacket 50 of the pipe fitting 18 in an axial direction 72 toward the grab plate 58, the shape of the set of die segments 70 may compress the fitting jacket 50 circumferentially inward in a radial direction 74, for example, such that the fitting jacket 50 and pipe segment tubing 22 disposed in a corresponding tubing cavity 54 are conformally deformed.

To facilitate compressing a set of die segments 70 loaded in its die plate 60 against a fitting jacket 50 in an axial direction 72, as in the depicted example, a swage machine 38 may include one or more swaging actuators 64. In particular, in the depicted example, the swage machine 38 include a first swaging actuator 64A and an Nth swaging actuator 64N. In some embodiments, one or more swaging actuators 64 in a swage machine 38 may be a fluid actuator, such as a hydraulic actuator or a pneumatic actuator. In any case, as depicted, each swaging actuator 64 of the swage machine 38 includes an actuator cylinder 78 and an actuator piston 76, which selectively extends out from the actuator cylinder 78 based at least in part on the supply of fluid (e.g., liquid and/or gas) to the actuator cylinder 78 and/or selectively retracts into the actuator cylinder 78 based at least in part on the extraction of fluid from the actuator cylinder 78.

In particular, in the depicted example, the actuator cylinder 78 of each swaging actuator 64 is secured to the die plate 60 of the swage machine 38. Additionally, in the depicted example, the actuator piston 76 of each swaging actuator 64 extends through the die plate 60 and is secured to the grab plate 58 of the swage machine 38. As such, to facilitate performing a swaging operation, the swage machine 38 may operate one or more of its swaging actuators 64 to pull the grab plate 58 toward the die plate 60 via one or more reverse (e.g., retracting) strokes such that the second fitting jacket 50B of the pipe fitting 18 secured to the grab plate 58 moves through the set of die segments 70 loaded in the die plate 60.

In other words, the ability of a swage machine 38 to swage a pipe fitting 18 may be premised on a set of die segments 70 and, thus, the die plate 60 in which the set of die segments 70 is loaded being disposed circumferentially around the pipe fitting 18. Additionally, as described above, to facilitate securing a swage machine 38 to a pipe fitting 18, the grab plate 58 of the swage machine 38 may matingly interlock with a grab notch 68 implemented circumferentially along the outer surface of the pipe fitting 18. Since a pipe fitting 18 to be swaged may not necessarily be at an end of a pipeline system 10, swage machine plates (e.g., die plate 60 and/or grab plate 58) of a swage machine 38 may be implemented to selectively transition between an opened state, which enables the swage machine 38 to be deployed at or removed from the pipe fitting 18, and a closed state, which enables the swage machine 38 to swage the pipe fitting 18.

Figure 5:
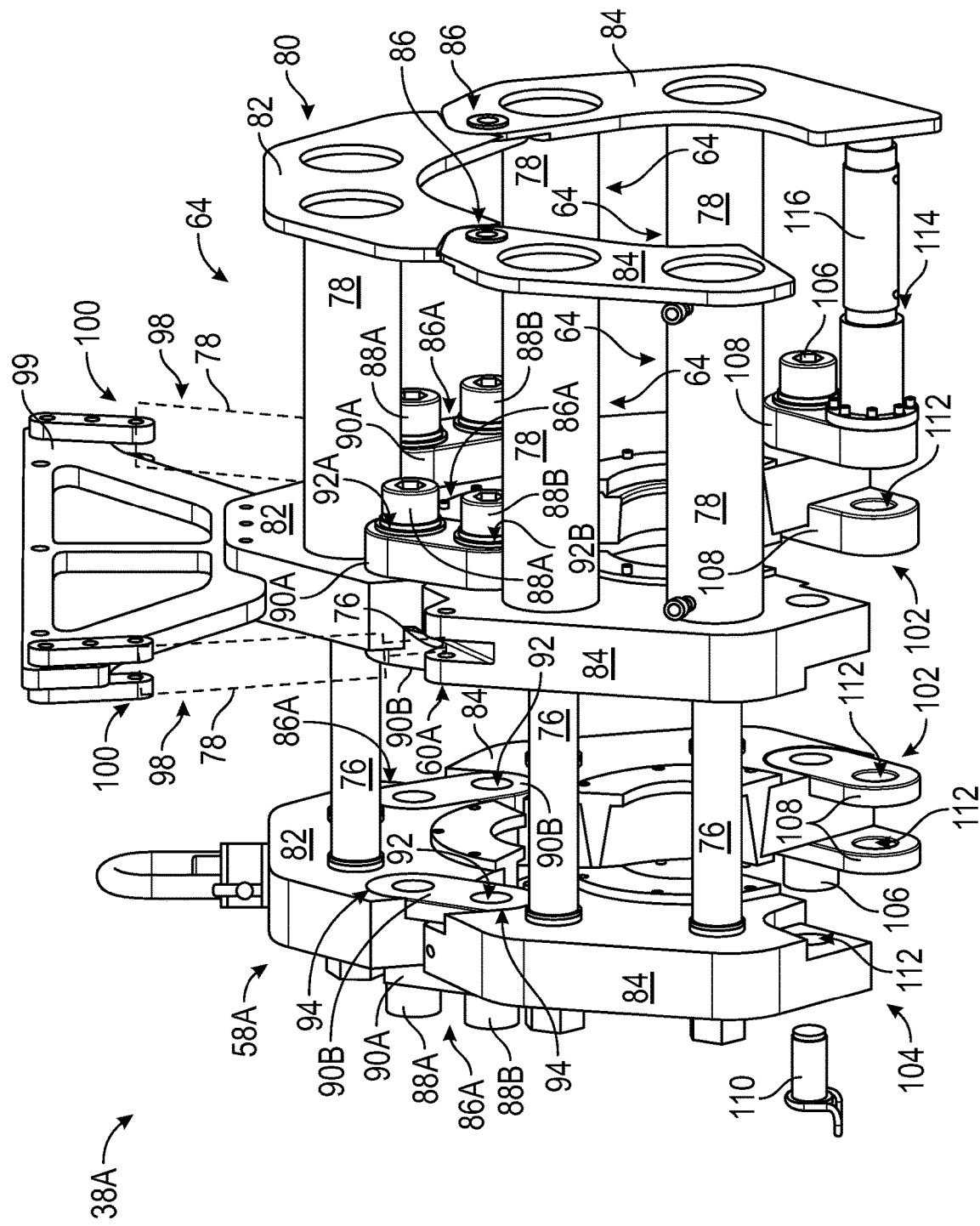
FIG. 5 is a perspective view of an example of the swage machine of FIG. 4 in an opened state, in accordance with an embodiment of the present disclosure.
Figure 6:
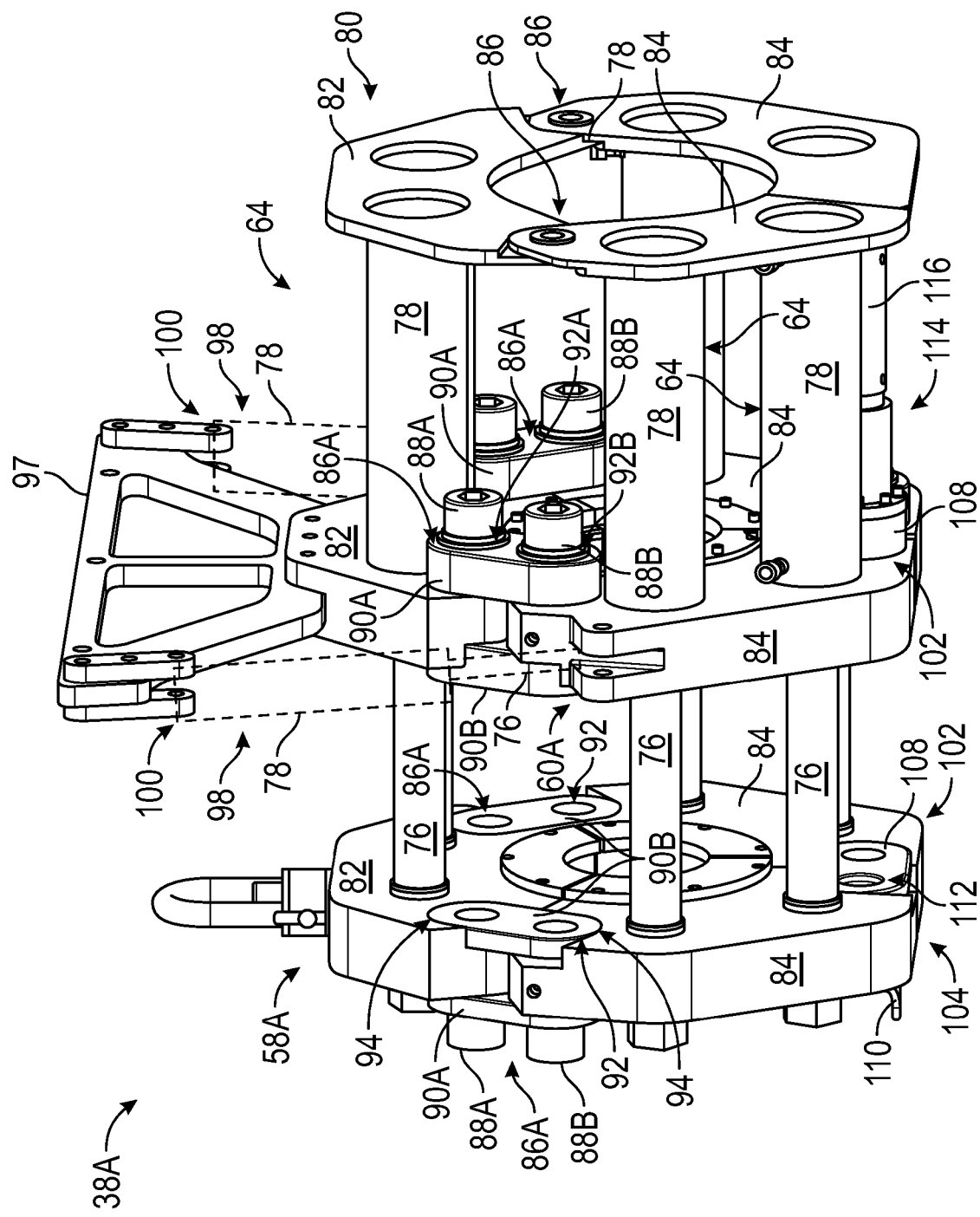
FIG. 6 is a perspective view of the swage machine of FIG. 5 in a closed state, in accordance with an embodiment of the present disclosure.

To help illustrate, a more detailed example of a swage machine 38A is shown in FIGS. 5 and 6. In particular, FIG. 5 shows the swage machine 38A in an opened state. On the other hand, FIG. 6 shows the swage machine 38A in its closed state.

As in the depicted example, in addition to a grab plate 58 and a die plate 60, in some embodiments, a swage machine 38 may include a support plate 80. In particular, in the depicted example, swaging actuators 64 of the swage machine 38A are each secured to the support plate 80 such that its actuator cylinder 78 is secured between the support plate 80 and the die plate 60A. As such, the support plate 80 may be implemented to facilitate supporting the swaging actuators 64 of the swage machine 38A. Moreover, at least in some instances, the actuator cylinders 78 of the swaging actuators 64 may facilitate transferring force (e.g., stress and/or load) exerted on the die plate 60A to the support plate 80.

However, it should be appreciated that the depicted example is merely intended to be illustrative and not limiting. In particular, in other embodiments, a swage machine 38 may additionally include a housing, for example, disposed around the actuator cylinders 78 of its swaging actuators 64 and secured to its die plate 60 and its support plate 80. Additionally, in other embodiments, a swage machine 38 may not include a support plate 80. Furthermore, in other embodiments, a swage machine 38 may additionally include one or more support bars secured between its die plate 60 and its support plate 80, for example, to facilitate supplementing the force transfer provided by the actuator cylinders 78 of the swaging actuators 64 in the swage machine 38. Moreover, in other embodiments, a swage machine 38 may include more than six (e.g., seven, eight, or more) swaging actuators 64 or less than six (e.g., five, four, or less) swaging actuators 64.

In any case, as in the depicted example, to enable a swage machine 38 to be transitioned between its opened state and its closed state, each plate (e.g., grab plate 58, die plate 60, and/or support plate 80) of the swage machine 38 may be implemented using multiple plate sections—namely a base plate section 82 and one or more pivotable plate sections 84. In particular, to facilitate transitioning between the opened state and the closed state, each pivotable plate section 84 of a swage machine plate may be implemented to rotate (e.g., pivot) relative to the base plate section 82 of the swage machine plate. To enable a pivotable plate section 84 to rotate relative to a corresponding base plate section 82, the pivotable plate section 84 may be connected to the base plate section 82 via a hinge 86.

In some instances, a swage machine hinge 86 connected between a first (e.g., base) plate section and a second (e.g., pivotable) plate section of a swage machine plate may be implemented at least in part by forming a hinge slot with pin openings in the second plate section and forming a hinge extension with a pin opening on the first plate section. The hinge extension on the first plate section may then be disposed within the hinge slot in the second plate section such that the hinge extension pin opening is aligned with the hinge slot pin openings and a pin may then be secured within the pin openings. However, a swage machine hinge 86 implemented in this manner generally results in a substantially (e.g., significant) air gap (e.g., free space) being present within the swage machine hinge 86 and, thus, limiting its strength.

To facilitate improving hinge strength, as depicted, each hinge 86 of the swage machine 38A is implemented to reduce (e.g., minimize) the presence of any air gap therein. In particular, as depicted, each hinge 86A in the grab plate 58A and the grab plate 60A includes multiple hinge fasteners 88 and a (e.g., first) hinge plate 90A, which is implemented to be secured to outward-facing (e.g., first) sides of a base plate section 82 and a corresponding pivotable plate section 84 via the hinge fasteners 88. As in the depicted example, in some embodiments, a hinge fastener 88 in a swage machine hinge 86 may include a bolt.

Thus, to facilitate securing a hinge plate 90 to the base plate section 82 and a corresponding pivotable plate section 84 of a swage machine plate, as depicted, the hinge plate 90 includes a first fastener opening (e.g., hole) 92A, which is implemented to be aligned with a fastener opening 92 in the base plate section 82, and a second fastener opening 92B, which is implemented to be aligned with a fastener opening 92 in the pivotable plate section 84. As such, the hinge plate 90 may be secured to the base plate section 82 at least in part by securing a first hinge fastener 88A in the first hinge plate fastener opening 92A and the base section fastener opening 92. Similarly, the hinge plate 90 may be secured to the pivotable plate section 84 at least in part by securing a second hinge fastener 88B in the second hinge plate fastener opening 92B and the pivotable section fastener opening 92.

As in the depicted example, implementing a swage machine hinge 86A in this manner may enable a hinge plate 90 of the swage machine hinge 86A to directly abut a corresponding base plate section 82 and a corresponding pivotable plate section 84 of a swage machine plate, thereby reducing the presences of any air gap within the swage machine hinge 86A and, thus, at least in some instances, improving hinge strength. To facilitate further improving hinge strength, as in the depicted example, in some embodiments, a swage machine hinge 86A may additionally include a second hinge plate 90B. In particular, as in the depicted example, the second hinge plate 90B may be implemented to be secured to inward-facing (e.g., second and/or opposite) sides of a corresponding base plate section 82 and a corresponding pivotable plate section 84 via the hinge fasteners 88 used to secure a first hinge plate 90A of the swage machine hinge 86A to the outward-facing sides of the base plate section 82 and the pivotable plate section 84.

Moreover, implementing a swage machine hinge 86A in this manner may enable the tradeoff between hinge strength and resulting swage machine weight to be adaptively adjusted. For example, when less force (e.g., stress and/or load) is expected to be exerted on a (e.g., grab) plate of a swage machine 38, thinner hinge plates 90 may be used in the swage machine hinges 86A of the swage machine plate to facilitate reducing the weight of the swage machine 38. On the other hand, when more force is expected to be exerted on a (e.g., die) plate of a swage machine, thicker hinge plates 90 may be used in the swage machine hinges 86A of the swage machine plate to facilitate improving hinge strength. In fact, in some embodiments, different thickness hinge plates 90 may be swapped into a swage machine hinge 86A based at least in part on the force expected to be exerted thereon.

However, it should again be appreciated that the depicted example is merely intended to be illustrative and not limiting. In particular, in other embodiments, a swage machine hinge 86A may include a single hinge plate 90. Additionally, although generally placed under less stress (e.g., force and/or load), in other embodiments, a swage machine hinge 86 in a support plate 80 may be implemented in the same manner as a swage machine hinge 86A in a corresponding grab plate 58 and/or a corresponding die plate 60. Moreover, in other embodiments, a hinge fastener 88 of a swage machine hinge 86A may be implemented to be secured in a fastener opening 92 in a hinge plate 90 and a fastener opening 92 in a first plate section of a swage machine plate as well as a fastener opening 92 in a second plate section of the swage machine plate.

Figure 7:
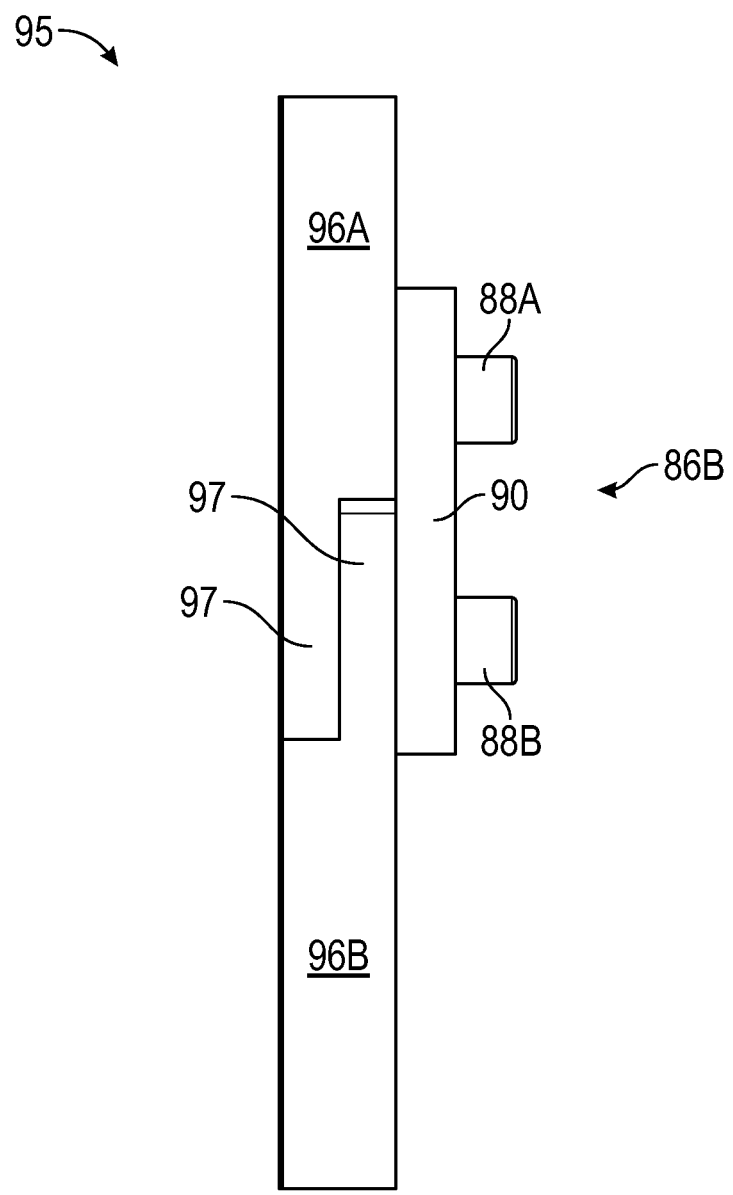
FIG. 7 is a side view of an example of a portion of a swage machine plate that includes a hinge, in accordance with an embodiment of the present disclosure.

To help illustrate, a portion 95 of a swage machine plate (e.g., grab plate 58, die plate 60, or support plate 80), which includes another example of a swage machine hinge 86B, is shown in FIG. 7. Similar to the swage machine hinges 86A in the grab plate 58A and the die plate 60A of FIGS. 5 and 6, the swage machine hinge 86B of FIG. 7 includes a hinge plate 90, a first hinge fastener 88A, and a second hinge fastener 88B. In particular, similar to the swage machine hinges 86A in the grab plate 58A and the die plate 60A of FIGS. 5 and 6, the first hinge fastener 88A is used to secure the hinge plate 90 to a first (e.g., base) plate section 96A of the swage machine plate and the second hinge fastener 88B is used to secure the hinge plate 90 to a second (e.g., pivotable) plate section 96B of the swage machine plate.

However, as depicted in FIG. 7, the second hinge fastener 88B is additionally used to secure the hinge plate 90 to the first (e.g., base) plate section 96A of the swage machine plate. Nevertheless, similar to FIGS. 5 and 6, as depicted in FIG. 7, implementing a swage machine hinge 86B in this manner may enable the hinge plate 90 of the swage machine hinge 86B to directly abut a corresponding plate sections 96, thereby reducing the presences of any air gap within the swage machine hinge 86B and, thus, at least in some instances, improving hinge strength. Moreover, implementing a swage machine hinge 86B in this manner may nevertheless enable the tradeoff between hinge strength and resulting swage machine weight to be adaptively adjusted. For example, when less force (e.g., stress and/or load) is expected to be exerted on a (e.g., grab) plate of a swage machine 38, thinner hinge plates 90 may be used in swage machine hinges 86B of the swage machine plate to facilitate reducing the weight of the swage machine 38. On the other hand, when more force is expected to be exerted on a (e.g., die) plate of a swage machine, thicker hinge plates 90 may be used in swage machine hinges 86B of the swage machine plate to facilitate improving hinge strength. In fact, in some embodiments, different thickness hinge plates 90 may be swapped into a swage machine hinge 86B based at least in part on the force expected to be exerted thereon.

However, it should be appreciated that the depicted example is merely intended to be illustrative and not limiting. In particular, in other embodiments, a swage machine hinge 86B may nevertheless include multiple hinge plates 90. In other words, in such embodiments, the swage machine hinge 86B may additionally include another hinge plate 90, which is implemented to be secured to opposite sides of corresponding plate sections 96.

In any case, to facilitate the presence of any air gap within the swage machine hinge 86B, as in the example depicted in FIG. 7, in some embodiments, hinge extensions 97 may be implemented on the first plate section 96A and the second plate section 96B such that the combined thickness of the hinge extensions 97 approximately matches the thickness of the remainder of the plate sections 96. For example, in some such embodiments, a hinge extension 97 may be implemented on a plate section 96 of a swage machine plate such that the thickness of the hinge extension 97 is approximately half the thickness of the remainder of the plate section 96. In any case, implementing a swage machine hinge 86 in accordance with the present disclosure may enable a pivotable plate section 84 of a swage machine plate to rotate (e.g., pivot) relative to the base plate section 82 of the swage machine plate, for example, due to rotation of a hinge plate 90 relative to the base plate section 82 and/or rotation of the pivotable plate section 84 relative to the hinge plate 90.

However, to facilitate improving control over the transition of a swage machine plate (e.g., grab plate 58, die plate 60, or support plate 80) between its opened state and its closed state, in some embodiments, one or more plate sections 96 of the swage machine plate may be implemented to limit rotation of a hinge plate 90 relative thereto. For example, in some such embodiments, the base plate section 82 of a swage machine plate may be implemented to block rotation of a hinge plate 90 relative thereto, thereby resulting in a corresponding pivotable plate section 84 of the swage machine plate rotating relative to the base plate section 82 due solely to rotation of the pivotable plate section 84 relative to the hinge plate 90. Additionally or alternatively, although a hinge plate 90 is allowed to rotate relative thereto, a pivotable plate section 84 of a swage machine plate may be implemented to limit rotation to a specific range.

To facilitate limiting rotation of a hinge plate 90 relative to a plate section 96 of a swage machine plate, as in the example depicted in FIGS. 5 and 6, in some embodiments, a hinge plate recess 94 may be implemented in the plate section 96, for example, such that the hinge plate recess 94 surrounds a corresponding fastener opening 92 in the plate section 96. In particular, to facilitate limiting rotation of a hinge plate 90 to a specific range, in some embodiments, a hinge plate recess 94 in a (e.g., pivotable) plate section 96 of a swage machine plate may be implemented such that the shape of a first side of the hinge plate recess 94 generally matches the shape of a first side of a corresponding end of the hinge plate 90 when the hinge plate 90 is at one end of the specific rotation range and the shape of a second (e.g., opposite) side of the hinge plate recess 94 generally matches the shape of a second (e.g., opposite) side of the corresponding end of the hinge plate 90 when the hinge plate 90 is at the other end of the specific rotation range. Additionally, to facilitate blocking rotation of a hinge plate 90 relative thereto, in some embodiments, a hinge plate recess 94 in a (e.g., base) plate section 96 of a swage machine plate may be implemented such that the shape of the hinge plate recess 94 generally matches the shape of a corresponding end of the hinge plate 90.

However, it should again be appreciated that the depicted example is merely intended to be illustrative and not limiting. In particular, to facilitate blocking rotation of a hinge plate 90 relative to a plate section 96 of a swage machine plate, in some embodiments, the hinge fastener 88 used to secure the hinge plate 90 to the plate section 96 may be a shear screw, for example, instead of a bolt. Additionally, although depicted as terminating in a second hinge plate 90B, in other embodiments, a hinge fastener 88 of a swage machine hinge 86 may instead terminate in a corresponding plate section 96, for example, when the swage machine hinge 86 does not include the second hinge plate 90B. Alternatively, although depicted as terminating in a second hinge plate 90B, in other embodiments, a hinge fastener 88 (e.g., bolt) of a swage machine hinge 86 may instead extend through the second hinge plate 90B. In other words, at least in such embodiments, a hinge fastener 88 in a swage machine hinge 86 may additionally include a nut, which is implemented to be secured to a threaded end of a bolt in the hinge fastener 88.

In any case, as in the depicted example, in some embodiments, a swage machine 38 may additionally include an equipment base 99 secured to the base plate section 82 of its die plate 60. In particular, the equipment base 99 of the swage machine 38A may be implemented to facilitate moving the swage machine 38A, for example, via a crane. Additionally, as in the depicted example, to facilitate transitioning a swage machine 38 between its opened state and its closed state, in some embodiments, one or more base actuators 98, which are shown in dashed lines so as not obstruct other features, may each be secured between the equipment base 99 of the swage machine 38 and a corresponding plate section 96 of the swage machine 38.

In particular, as in the depicted example, in some embodiments, each base actuator 98 may be secured such that its actuator cylinder 78 is pivotably secured to the equipment base 99 and its actuator piston 76 is pivotably secured to a corresponding pivotable plate section 84 of a swage machine plate. Accordingly, as depicted in FIG. 5, operating a base actuator 98 to retract its actuator piston 76 into its actuator cylinder 78 may cause a corresponding pivotable plate section 84 of the die plate 60A to rotate (e.g., pivot) toward its securement point 100 on the equipment base 99. In other words, since the pivotable plate sections 84 of the die plate 60A are connected to the pivotable plate sections 84 of the grab plate 58A via the actuator pistons 76 of the swaging actuators 64 and to the pivotable plate sections 84 of the support plate 80 via the actuator cylinders 78 of the swaging actuators 64, operating the operating the base actuator 98 to retract its actuator piston 76 into its actuator cylinder 78 may facilitate transitioning the swage machine 38A from its closed state toward its opened state.

On the other hand, as depicted in FIG. 6, operating a base actuator 98 to extend its actuator piston 76 out from its actuator cylinder 78 may cause a corresponding pivotable plate section 84 of the die plate 60A to rotate (e.g., pivot) away from its securement point 100 on the equipment base 99. In other words, since the pivotable plate sections 84 of the die plate 60A are connected to the pivotable plate sections 84 of the grab plate 58A via the actuator pistons 76 of the swaging actuators 64 and to the pivotable plate sections 84 of the support plate 80 via the actuator cylinders 78 of the swaging actuators 64, operating the base actuator 98 to extend its actuator piston 76 out from its actuator cylinder 78 may facilitate transitioning the swage machine 38A from its opened state toward its closed state. In this manner, a swage machine 38 with improved hinge strength may be implemented and/or operated to selective transition between its opened state, which enables the swage machine 38 to be deployed at or removed from a pipe fitting 18, and a closed state, which enables the swage machine 38 to swage the pipe fitting 18.

However, it should again be appreciated that the depicted example is merely intended to be illustrative and not limiting. In particular, in other embodiments, a base actuator 98 may be secured such that its actuator piston 76 is secured to the equipment base 99 of a swage machine 38 while is actuator cylinder 78 is secured to a corresponding pivotable plate section 84. Additionally, in other embodiments, a swage machine 38 may not include an equipment base 99. Furthermore, in other embodiments, a swage machine 38 may not include a base actuator 98, for example, when the swage machine 38 is implemented to be manually transitioned between its opened state and its closed state.

In any case, as in the depicted example, to facilitate maintaining a swage machine 38 in its closed state, in some embodiments, the swage machine 38 may additionally include a pinning assembly 102. In particular, in the depicted example, a pinning assembly 102 of a swage machine 38 may include a manual pinning sub-assembly 104 having a pinning fastener 106, such as a bolt or a screw, one or more pinning plates 108, which are implemented to be secured to a plate section 96 of a swage machine plate (e.g., grab plate 58) via the pinning fastener 106, and a manual pin 110, which is implemented to be inserted in a pin opening 112 in an opposing plate section 96 of the swage machine plate and a pin opening 112 in each of the one or more pinning plates 108. Accordingly, as depicted in FIG. 6, since the plate sections 96 of the grab plate 58A are connected to the plate sections 96 of the die plate 60A via actuator pistons 76 of the swaging actuators 64, inserting the manual pin 110 in the plate section pin opening 112 and each corresponding pinning plate pin opening 112 may facilitate maintaining the swage machine 38A in its closed state.

Additionally, as in the depicted example, in some embodiments, a pinning assembly 102 of a swage machine 38 may include an automated pinning sub-assembly 114. In particular, as in the depicted example, similar to a manual pinning sub-assembly 104, an automated pinning sub-assembly 114 may include a pinning fastener 106, such as a bolt or a screw, and one or more pinning plates 108, which are implemented to be secured to a plate section 96 of a swage machine plate (e.g., die plate 60) via the pinning fastener 106. However, instead of a manual pin 110, as in the depicted example, the automated pinning sub-assembly 114 may include a pinning actuator 116, which is implemented and/or operated to selectively insert its actuator piston 76 into a pin opening 112 in an opposing plate section 96 of the swage machine plate and each corresponding pin opening 112 in the one or more pinning plates 108. Accordingly, as depicted in FIG. 6, since the plate sections 96 of the die plate 60A are connected to the plate sections 96 of the grab plate 58A via actuator pistons 76 of the swaging actuators 64, inserting the actuator piston 76 of the pinning actuator 116 into the plate section pin opening 112 and each corresponding pinning plate pin opening 112 may facilitate maintaining the swage machine 38A in its closed state.

However, it should again be appreciated that the depicted example is merely intended to be illustrative and not limiting. In particular, in other embodiments, a swage machine 38 may not include a pinning assembly 102, for example, when the swage machine 38 is implemented to rely on base actuators 98 to hold the swage machine 38 in its closed state. Additionally, in other embodiments, a pinning assembly 102 of a swage machine 38 may include only a manual pinning sub-assembly 104 or only an automated pinning sub-assembly 114. Furthermore, in other embodiments, a manual pinning sub-assembly 104 may be implemented on the die plate 60 of a swage machine 38 while an automated pinning sub-assembly 114 may be implemented on the grab plate 58 of the swage machine 38. In any case, in this manner, a swage machine 38 may be implemented with improved hinge strength, which, at least in some instances, may facilitate improving load capacity of the swage machine 38, for example, to facilitate making the swage machine 38 suitable for swaging larger diameter pipe fittings 18 in a pipeline system 10.

Figure 8:
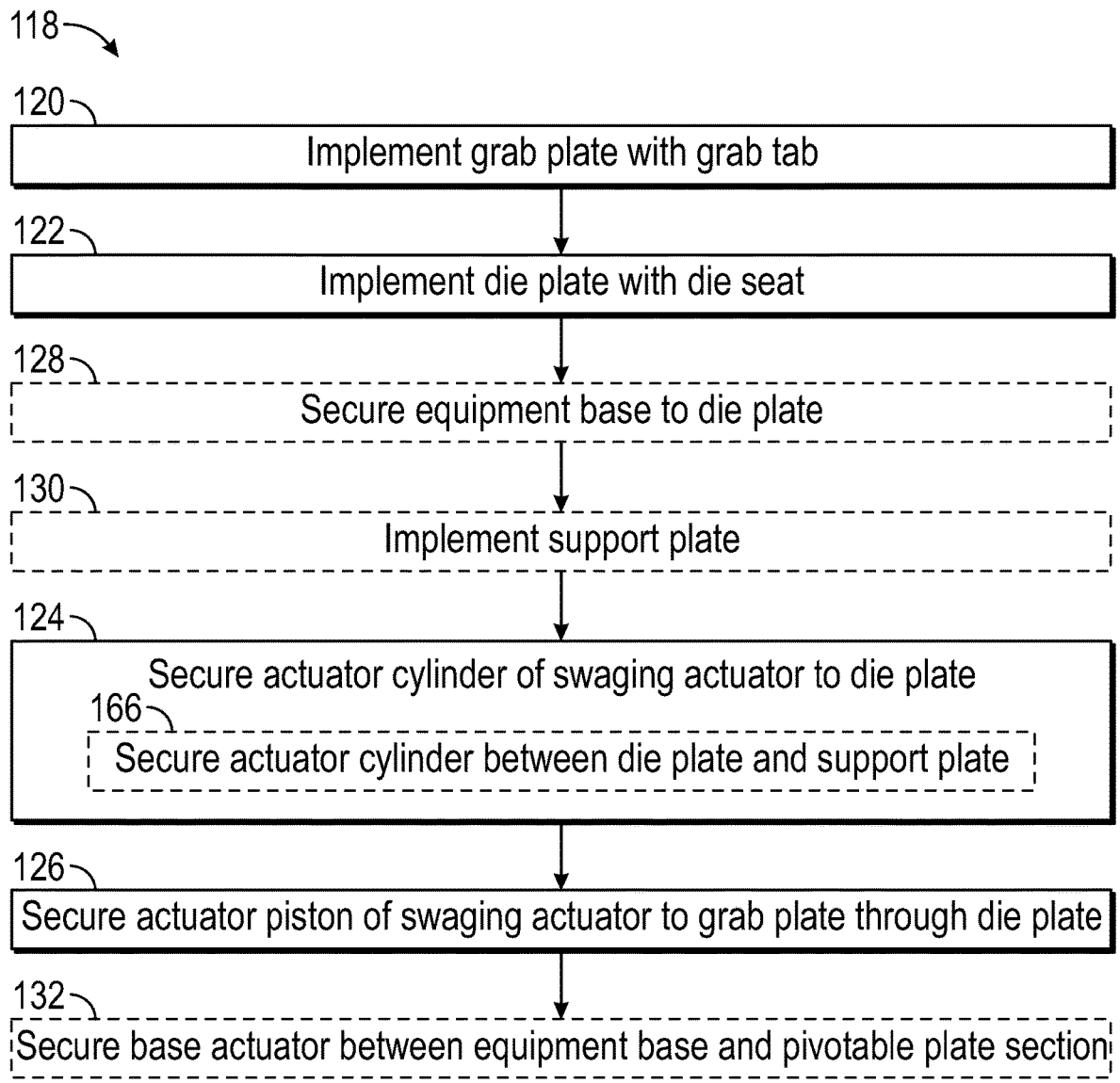
FIG. 8 is a flow diagram of an example of a process for implementing a swage machine, in accordance with an embodiment of the present disclosure.

To help further illustrate, an example of a process 118 for implementing a swage machine 38 is described in FIG. 8. Generally, the process 118 includes implementing a grab plate with a grab tab (process block 120) and implementing a die plate with a die seat (process block 122). Additionally, the process 118 generally includes securing an actuator cylinder of a swaging actuator to the die plate (process block 124) and securing an actuator piston of the swaging actuator to the grab plate through the die plate (process block 126).

Although described in a specific order, which corresponds with an embodiment of the present disclosure, it should be appreciated that the example process 118 is merely intended to be illustrative and non-limiting. In particular, in other embodiments, a process 118 for implementing a swage machine 38 may include one or more additional process blocks and/or omit one or more of the depicted process blocks. For example, some embodiments of the process 118 may additionally include securing an equipment base to the die plate (process block 128) while other embodiments of the process 118 do not. As another example, some embodiments of the process 118 may additionally include implementing a support plate (process block 130) while other embodiments of the process 118 do not. As a further example, some embodiments of the process 118 may additionally include securing a base actuator between the equipment base and a pivotable plate section (process block 132) while other embodiments of the process 118 do not. Moreover, in other embodiments, one or more of the depicted process blocks may be performed in a different order, for example, such that the die plate is implemented before the grab plate.

In any case, as described above, a swage machine 38 may generally include a grab plate 58 having a grab tab 66, which is implemented to matingly interlock with a grab notch 68 that runs circumferentially along an outer surface of a pipe fitting 18 to be swaged by the swage machine 38 to facilitate securing the swage machine 38 to the pipe fitting 18. As such, implementing a swage machine 38 may generally include implementing a grab plate 58 with a grab tab 66 that is expected to matingly interlock with a grab notch 68 on a pipe fitting 18 to be swaged by the swage machine 38 (process block 120). In particular, in some embodiments, the grab plate 58 of a swage machine 38 may be implemented at least in part using metal, such as carbon steel, stainless steel, duplex stainless steel, super duplex stainless steel, or any combination thereof.

In addition to a grab plate 58, as described above, a swage machine 38 may generally include a die plate 60 having a die seat 69 that is implemented to enable a set of die segments 70, which are to be used to swage a pipe fitting 18, to be loaded in the swage machine 38. As such, implementing a swage machine 38 may generally include implementing a die plate 60 with a die seat 69, which enables a set of die segments 70 to be loaded in the swage machine 38 (process block 122). In particular, in some embodiments, the die plate 60 of a swage machine 38 may be implemented at least in part using metal, such as carbon steel, stainless steel, duplex stainless steel, super duplex stainless steel, or any combination thereof.

As described above, in some embodiments, a swage machine 38 may additionally include an equipment base 99 secured to its die plate 60, for example, to facilitate moving the swage machine 38 using a crane. In other words, in such embodiments, implementing the swage machine 38 may include securing an equipment base 99 to its die plate 60 (process block 128). In particular, in some such embodiments, the equipment base 99 may implemented at least in part using metal, such as carbon steel, stainless steel, duplex stainless steel, super duplex stainless steel, or any combination thereof, and, thus, secured to the die plate 60 using hot tooling, such as welding, brazing, or the like.

In addition to its grab plate 58 and its die plate 60, as described above, in some embodiments, a swage machine 38 may include a support plate 80. In other words, in such embodiments, implementing the swage machine 38 may include implementing a support plate (process block 130). In particular, in some embodiments, the support plate 80 of a swage machine 38 may be implemented at least in part using metal, such as carbon steel, stainless steel, duplex stainless steel, super duplex stainless steel, or any combination thereof.

In any case, as described above, to enable a swage machine 38 to selectively transition between its opened state and its closed state, each plate (e.g., grab plate 58, die plate 60, and/or support plate 80) in the swage machine 38 may be implemented using multiple plate sections 96—namely a base plate section 82 and one or more pivotable plate sections 84. In particular, to facilitate transitioning between the opened state and the closed state, each pivotable plate section 84 of a swage machine plate may be implemented to rotate (e.g., pivot) relative to the base plate section 82 of the swage machine plate. To enable a pivotable plate section 84 to rotate relative to a corresponding base plate section 82, the pivotable plate section 84 may be connected to the base plate section 82 via a hinge 86. In other words, implementing a swage machine plate may include implementing multiple plate sections 96 and implementing a swage machine hinge 86.

Figure 9:
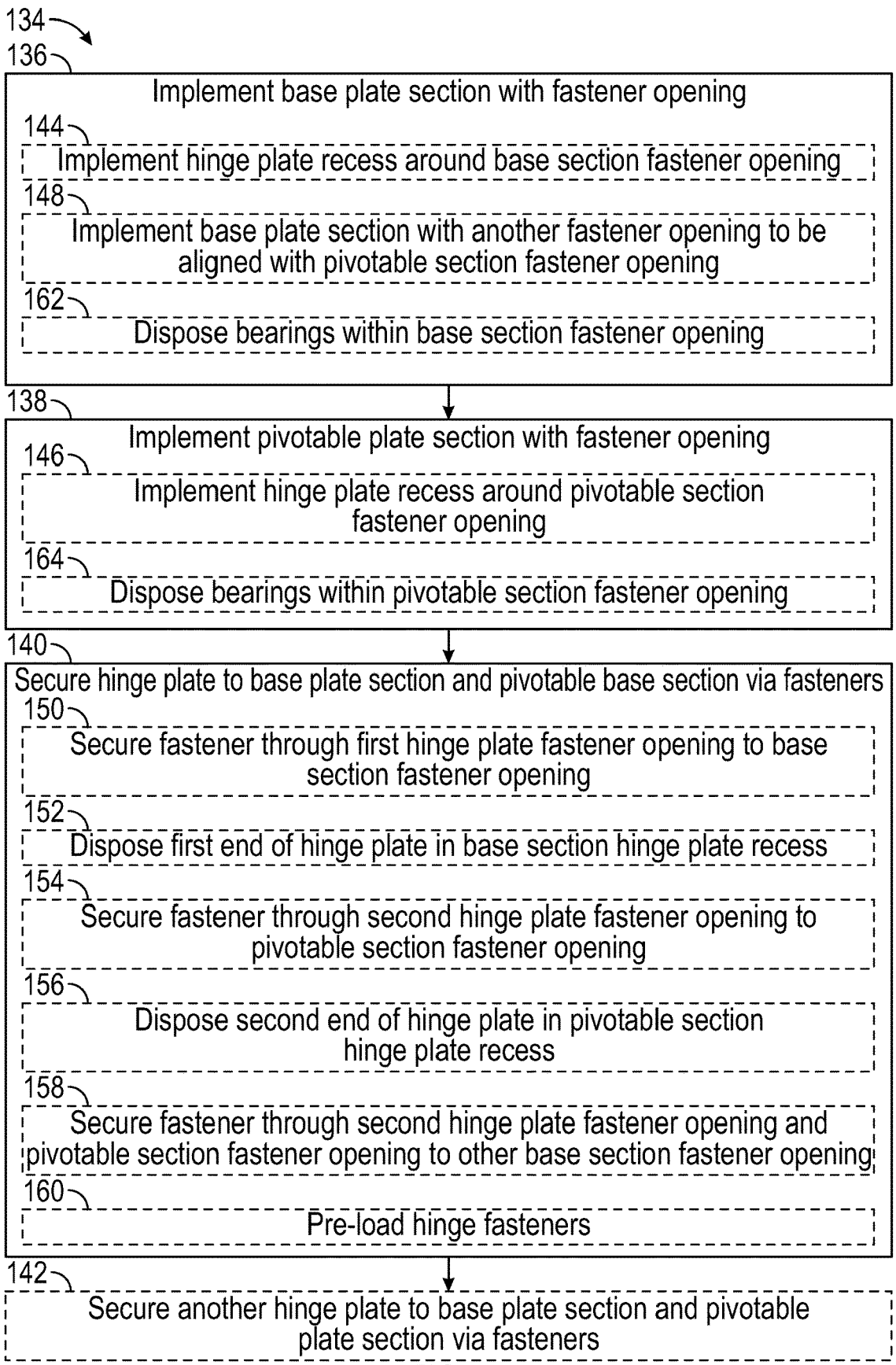
FIG. 9 is a flow diagram of an example of a process for implementing a swage machine plate, in accordance with an embodiment of the present disclosure.

To help further illustrate, an example of a process 134 for implementing a (e.g., grab, die, or support) plate of a swage machine 38 is described in FIG. 9. Generally, the process 134 includes implementing a base plate section with a fastener opening (process block 136) and implementing a pivotable plate section with a fastener opening (process block 138). Additionally, the process 134 generally includes securing a hinge plate to the base plate section and the pivotable plate section via fasteners (process block 140).

Although described in a specific order, which corresponds with an embodiment of the present disclosure, it should be appreciated that the example process 134 is merely intended to be illustrative and non-limiting. In particular, in other embodiments, a process 134 for implementing a swage machine plate may include one or more additional process blocks and/or omit one or more of the depicted process blocks. For example, some embodiments of the process 134 may additionally include securing another hinge plate to the base plate section and the pivotable plate section via fasteners (process block 142) while other embodiments of the process 134 do not. Moreover, in other embodiments, one or more of the depicted process blocks may be performed in a different order, for example, such that the pivotable plate section is implemented before the base plate section.

In any case, as described above, to enable a swage machine plate (e.g., grab plate 58, die plate 60, or support plate 80) to selectively transition between its opened state and its closed state, the swage machine plate may generally include a base plate section 82 and one or more pivotable plate sections 84, which are implemented to rotate (e.g., pivot) relative to the base plate section 82. In particular, to enable a pivotable plate section 84 to rotate relative to the base plate section 82, as described above, one or more hinge plates 90 may be secured to the base plate section 82 and the pivotable plate section 84 via hinge fasteners 88, such as bolts or screws. As such, implementing a swage machine plate may generally include implementing a base plate section 82 with one or more fastener openings 92 (process block 136) and implementing one or more pivotable plate sections 84 each with a fastener opening 92 (process block 138). In particular, in some embodiments, a fastener opening 92 may be implemented in a plate section 96 during initial manufacture of the plate section 96, for example, at least in part by using a mold that blocks material from forming at a target location of the fastener opening 92. However, in other embodiments, a fastener opening 92 may be implemented in a plate section 96 after initial manufacture of the plate section 96, for example, at least in part by drilling and/or milling the plate section 96.

Additionally, as described above, to facilitate limiting rotation of a hinge plate 90 relative thereto, in some embodiments, a plate section 96 of a swage machine plate may include a hinge plate recess 94 implemented around a fastener opening 92 in the plate section 96. In other words, in some such embodiments, implementing the base plate section 82 may include implementing a hinge plate recess 94 around its base section fastener opening 92, for example, such that the shape of the hinge plate recess 94 generally matches the shape of a corresponding end of a hinge plate 90 and, thus, facilitates blocking rotation of the hinge plate 90 relative to the base plate section 82 (process block 144). Additionally, in some such embodiments, implementing a pivotable plate section 84 may include implementing a hinge plate recess 94 around its pivotable section fastener opening 92, for example, such that the shape of the hinge plate recess 94 facilitates limiting rotation of a corresponding hinge plate 90 to a specific range relative to the pivotable plate section 84 (process block 146). In any case, in some embodiments, a hinge plate recess 94 may be implemented in a plate section 96 during initial manufacture of the plate section 96, for example, at least in part by using a mold that blocks material from forming at a target location of the hinge plate recess 94. However, in other embodiments, a hinge plate recess 94 may be implemented in a plate section 96 after initial manufacture of the plate section 96, for example, at least in part by drilling and/or milling the plate section 96.

Furthermore, as described above, in addition to a fastener opening 92, in some embodiments, a plate section 96 of a swage machine plate may include another fastener opening 92, which is implemented to align with a fastener opening 92 in another plate section 96 of the swage machine plate. In other words, in some such embodiments, implementing the base plate section 82 may include implementing another fastener opening 92 to be aligned with a fastener opening 92 in a corresponding pivotable plate section 84 (process block 148). Additionally, as described above, to facilitate reducing the presence of any air gap within a resulting swage machine hinge 86, in some such embodiments, the base plate section 82 and the pivotable plate section 84 may each be implemented with a hinge extension 97 such that a combined thickness of the hinge extensions 97 generally matches the thickness of the remainder of the plate sections 96. In any case, in some embodiments, a hinge extension 97 may be implemented on a plate section 96 during initial manufacture of the plate section 96, for example, at least in part by using a mold that enables material to be formed at a target location of the hinge extension 97. However, in other embodiments, a hinge extension 97 may be implemented in a plate section 96 after initial manufacture of the plate section 96, for example, at least in part by drilling and/or milling the plate section 96.

In any case, a (e.g., first) hinge plate 90 may then be secured to the base plate section 82 and a corresponding pivotable plate section 84 of the one or more pivotable plate sections 84 via hinge fasteners 88, such as a bolt or a screw (process block 140). In particular, as described above, a hinge plate 90 may be secured to a base plate section 82 at least in part by securing a first hinge fastener 88A through a first fastener opening 92A in the hinge plate 90 and a corresponding fastener opening 92 in the base plate section 82 (process block 150). In fact, in some embodiments, a first end of the hinge plate 90 may be disposed within a hinge plate recess 94, which is implemented in the base plate section 82 around the base section fastener opening 92, to facilitate aligning the first hinge plate fastener opening 92A with the base section fastener opening 92, for example, in addition to blocking rotation of the hinge plate 90 relative to the base plate section 82 (process block 152). In any case, to facilitate improving hinge strength, as described above, the first hinge fastener 88A may be secured through the first hinge plate fastener opening 92A to the base section fastener opening 92 such that the hinge plate 90 and the base plate section 82 directly abut one another.

Additionally, as described above, a (e.g., first) hinge plate 90 may be secured to a pivotable plate section 84 at least in part by securing a second hinge fastener 88B through a second fastener opening 92B in the hinge plate 90 and a corresponding fastener opening 92 in the pivotable plate section 84 (process block 154). In fact, in some embodiments, a second (e.g., opposite) end of the hinge plate 90 may be disposed within a hinge plate recess 94, which is implemented in the pivotable plate section 84 around the pivotable section fastener opening 92, to facilitate aligning the second hinge plate fastener opening 92B with the pivotable section fastener opening 92, for example, in addition to limiting rotation of the hinge plate 90 to a specific range relative to the pivotable plate section 84 (process block 156). In any case, to facilitate improving hinge strength, as described above, the second hinge fastener 88B may be secured through the second hinge plate fastener opening 92B to the pivotable section fastener opening 92 such that the hinge plate 90 and the pivotable plate section 84 directly abut one another.

Furthermore, as described above, in some embodiments, the second hinge fastener 88B may be used to secure a hinge plate 90 to a pivotable plate section 84 as well as a corresponding base plate section 82. In other words, in such embodiments, securing the hinge plate 90 to the base plate section 82 and a pivotable plate section 84 may include securing the second hinge fastener 88B through the second fastener opening 92B in the hinge plate 90 and a fastener opening 92 in the pivotable plate section 84 to a fastener opening 92 in the base plate section 82 (process block 158).

In particular, as described above, to facilitate improving hinge strength, in some such embodiments, the second hinge fastener 88B may be secured through the second hinge plate fastener opening 92B and the pivotable section fastener opening 92 to the base section fastener opening 92 such that the base plate section 82 and the pivotable plate section 84 directly abut one another.

To facilitate further improving hinge strength, as described above, in some embodiments, one or more hinge fasteners 88 may be pre-loaded (process block 160). In particular, as described above, a hinge fastener 88 may be pre-loaded at least in part by tightening the hinge fastener 88 beyond what is sufficient to cause a hinge plate 90 to directly abut a corresponding plate section 96 of a swage machine plate. In other words, pre-loading the hinge fastener 88 may compress the hinge plate 90 and the plate section 96 toward one another, which, at least in some instances, may facilitate further improving hinge strength, for example, due to the compressive force further reducing any air gap between the hinge plate 90 and the plate section 96 of the swage machine plate.

However, at least in some instances, securing a hinge plate 90 to a plate section 96 of a swage machine plate via a pre-loaded hinge fastener 88 may increase the difficulty with which they pivot relative to one another and, thus, the difficulty with which the swage machine plate can be transitioned between its opened state and its closed state. To facilitate improving the ease with which the swage machine plate can be transitioned between its opened state and its closed state, in some embodiments, in some embodiments, bearings may be disposed within the fastener opening 92 in the base plate section 82. In other words, in such embodiments, implementing the base plate section 82 may include disposing bearings within its base section fastener opening 92 (process block 162). Additionally or alternatively, to facilitate improving the ease with which the swage machine plate can be transitioned between its opened state and its closed state, in some embodiments, bearings may be disposed within the fastener opening 92 in a pivotable plate section 84. In other words, in such embodiments, implementing a pivotable plate section 84 may include disposing bearings within its pivotable section fastener opening 92 (process block 164).

Moreover, as described above, to facilitate further improving hinge strength, in some embodiments, a swage machine hinge 86 may be implemented with multiple hinge plates 90. In other words, in such embodiments, implementing the swage machine plate may include securing another (e.g., second) hinge plate 90 to the base plate section 82 and a corresponding pivotable plate section 84 via the hinge fasteners 88 (process block 142). In particular, as described above, in some such embodiments, the hinge fasteners 88 may be used to secure a hinge plate 90 to outward-facing (e.g., first) sides of the base plate section 82 and the pivotable plate section 84 as well as to secure the other hinge plate 90 to inward-facing (e.g., second and/or opposite) sides of the base plate section 82 and the pivotable plate section 84. In this manner, a (e.g., grab, die, or support) plate of a swage machine 38 may be implemented with improved hinge strength, which, at least in some instances, may facilitate improving load capacity of the swage machine 38, for example, to facilitate making the swage machine 38 suitable for swaging larger diameter pipe fittings 18 in a pipeline system 10.

Returning to the process 118 of FIG. 8, the actuator cylinders 78 of one or more swaging actuators 64 may then be secured to the die plate 60 of the swage machine 38

(process block 124). As described above, to facilitate supporting a swaging actuator 64, in some embodiments, the actuator cylinder 78 of the swaging actuator 64 may additionally be secured to the support plate 80 of the swage machine 38. In other words, in such embodiments, securing the actuator cylinder 78 of a swaging actuator 64 may include securing the actuator cylinder 78 between the die plate 60 and the support plate 80 (process block 166). Additionally, to facilitate controlling movement of the grab plate 58 and the die plate 60 in an axial direction 72 relative to one another and, thus, swaging of a pipe fitting 18, as described above, the actuator pistons 76 of one or more swaging actuators 64 may be secured to the grab plate 58 of the swage machine 38 through the die plate 60 of the swage machine 38 (process block 126).

Moreover, as described above, to facilitate controlling transitioning of a swage machine 38 between its opened state and its closed state, in some embodiments, the swage machine 38 may include one or more base actuators 98, which are each secured between the equipment base 99 of the swage machine 38 and a corresponding pivotable plate section 84 of the swage machine 38. In other words, in such embodiments, implementing the swage machine 38 may include securing one or more base actuators 98 between the equipment base 99 of the swage machine 38 and a corresponding pivotable plate section 84, for example, in the die plate 60 (process block 132). In this manner, the present disclosure provides techniques for implementing a swage machine 38 with improved hinge strength, which, at least in some instances, may facilitate improving load capacity of the swage machine 38, for example, to facilitate making the swage machine 38 suitable for swaging larger diameter pipe fittings 18 in a pipeline system 10.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A swage machine, comprising:
    a grab plate configured to matingly interlock with a pipe fitting to facilitate securing the swage machine to the pipe fitting; and
    a die plate having a die seat configured to enable a set of die segments that is to be used to conformally deform a portion of the pipe fitting around tubing of a pipe segment to be loaded in the swage machine, wherein the grab plate and the die plate comprise:
        a base plate section;
        a hinge plate configured to be secured to the base plate section via a first hinge fastener such that the hinge plate directly abuts the base plate section; and
        a pivotable plate section configured to be secured to the hinge plate via a second hinge fastener such that the hinge plate directly abuts the pivotable plate section, wherein the pivotable plate section is configured to rotate relative to the base plate section to facilitate transitioning the swage machine between an opened state and a closed state.

2. The swage machine of claim 1, wherein the die plate and the grab plate comprise:
    another hinge plate configured to be secured to the base plate section via a third hinge fastener such that the another hinge plate directly abuts the base plate section; and
    another pivotable plate section configured to be secured to the another hinge plate via a fourth hinge fastener such that the another hinge plate directly abuts the another pivotable plate section.

3. The swage machine of claim 1, wherein the die plate and the grab plate comprise another hinge plate configured to be secured to the base plate section via the first hinge fastener such that the another hinge plate directly abuts the base plate section and to be secured to the pivotable plate section via the second hinge fastener such that the another hinge plate directly abuts the pivotable plate section.

4. The swage machine of claim 1, comprising a swaging actuator secured to the die plate and the grab plate, wherein:
    the die plate is configured to enable the set of die segments to be loaded in the swage machine such that the set of die segments opens toward the grab plate; and
    the swaging actuator is configured to facilitate moving the die plate in an axial direction toward the grab plate over the portion of the pipe fitting to enable the swage machine to conformally deform the portion of the pipe fitting around the tubing of the pipe segment using the set of die segments.

5. The swage machine of claim 4, wherein the swaging actuator comprises:
    an actuator cylinder configured to be secured to the die plate; and
    an actuator piston configured to extend through the die plate and to be secured to the grab plate.

6. The swage machine of claim 1, wherein the hinge plate is also configured to be secured to the base plate section via the second hinge fastener such that the base plate section directly abuts the pivotable plate section.

7. The swage machine of claim 1, wherein:
    the base plate section comprises a first fastener opening;
    the hinge plate comprises a second fastener opening and a third fastener opening that is configured to be aligned with the first fastener opening in the base plate section, wherein the first fastener is configured to be secured in the first fastener opening in the base plate section and the third fastener opening in the hinge plate to facilitate securing the hinge plate to the base plate; and
    the pivotable plate section comprises a fourth fastener opening that is configured to be aligned with the second fastener opening in the hinge plate, wherein the second fastener is configured to be secured in the second fastener opening in the hinge plate and the fourth fastener opening in the pivotable plate section to facilitate securing the hinge plate to the pivotable plate section.

8. A method of implementing a swage machine, comprising:
    implementing a grab plate of the swage machine to enable the grab plate to matingly interlock with a pipe fitting to facilitate securing the swage machine to the pipe fitting; and
    implementing a die plate to include a die seat that enables a set of die segments that is to be used to conformally deform a portion of the pipe fitting around tubing of a pipe segment to be loaded in the swage machine, wherein implementing the grab plate and implementing the die plate comprise:
        implementing a base plate section;
        securing a hinge plate to the base plate section via a first hinge fastener such that the hinge plate directly abuts the base plate section; and
        securing the hinge plate to a pivotable plate section via a second hinge fastener such that the hinge plate directly abuts the pivotable plate section to enable the pivotable plate section to rotate relative to the base plate section to facilitate transitioning the swage machine between an opened state and a closed state.

9. The method of claim 8, wherein implementing the grab plate and implementing the die plate comprise:
   securing another hinge plate to the base plate section via a third fastener such that the another hinge plate directly abuts the base plate section; and
   securing the another hinge plate to another pivotable plate section via a fourth fastener such that the another hinge plate directly abuts the another pivotable plate section to enable the another pivotable plate section to rotate relative to the base plate section to facilitate transitioning the swage machine between the opened state and the closed state.

10. The method of claim 8, wherein implementing the grab plate and implementing the die plate comprise:
    securing another hinge plate to the base plate section via the first hinge fastener such that the another hinge plate directly abuts the base plate section; and
    securing the another hinge plate to the pivotable plate section via the second hinge fastener such that the another hinge plate directly abuts the pivotable plate section.

11. The method of claim 8, comprising securing a swaging actuator to the grab plate and the die plate to enable the swaging actuator to facilitate moving the die plate over the portion of the pipe fitting in an axial direction toward the grab plate such that the set of die segments conformally deform the pipe fitting around the tubing of the pipe segment.

12. The method of claim 11, wherein securing the swaging actuator to the grab plate and the die plate comprises:
    securing an actuator cylinder of the swaging actuator to the die plate; and
    securing an actuator piston of the swaging actuator to the grab plate such that the actuator piston extends through the die plate.

13. The method of claim 8, wherein implementing the grab plate and implementing die plate comprise also securing the hinge plate to the base plate section via the second hinge fastener such that the base plate section directly abuts the pivotable plate section.

14. The method of claim 8, wherein implementing the grab plate and implementing the die plate comprise:
    implementing the base plate section to include a first fastener opening;
    implementing the hinge plate to include a second fastener opening and a third fastener opening;
    aligning the first fastener opening in the base plate section with the third fastener opening in the hinge plate, wherein securing the hinge plate to the base plate section comprises securing the first hinge fastener in the first fastener opening in the base plate section and the third fastener opening in the pivotable plate section;
    implementing the pivotable plate section to include a fourth fastener opening; and
    aligning the second fastener opening in the hinge plate with the fourth fastener opening in the pivotable plate section, wherein securing the hinge plate to the pivotable plate section comprises securing the second hinge fastener in the second fastener opening in the hinge plate and the fourth fastener opening in the pivotable plate section.

15. A swage machine, comprising:
    a grab plate configured to matingly interlock with a pipe fitting to facilitate securing the swage machine to the pipe fitting; and
    a die plate having die seat configured to enable a set of die segments that is to be used to conformally deform a portion of the pipe fitting around tubing of a pipe segment to be loaded in the swage machine, wherein the grab plate and the die plate comprise:
      a plurality of plate sections configured to be disposed circumferentially around the pipe fitting; and
      a hinge configured to enable a first plate section of the plurality of plate sections and a second plate section of the plurality of plate sections to rotate relative to one another to facilitate transitioning the swage machine between an opened state and a closed state, wherein the hinge comprises:
        a hinge plate having a first fastener opening and a second fastener opening;
        a first hinge fastener configured to secure the hinge plate to the first plate section via the first fastener opening in the hinge plate such that the hinge plate directly abuts the first plate section; and
        a second hinge fastener configured to secure the hinge plate to the second plate section via the second fastener opening in the hinge plate such that the hinge plate directly abuts the second plate section.

16. The swage machine of claim 15, comprising another hinge configured to enable the first plate section and a third plate section of the plurality of plate sections to rotate relative to one another to facilitate transitioning the swage machine between the opened state and the closed state, wherein the another hinge comprises:
    another hinge plate having a third fastener opening and a fourth fastener opening;
    a third hinge fastener configured to secure the another hinge plate to the first plate section via the third fastener opening in the another hinge plate such that the another hinge plate directly abuts the first plate section; and
    a fourth hinge fastener configured to secure the another hinge plate to the third plate section via the fourth fastener opening in the another hinge plate such that the another hinge plate directly abuts the third plate section.

17. The swage machine of claim 15, wherein the hinge comprises another hinge plate having a third fastener opening and a fourth fastener opening, wherein:
    the first hinge fastener is configured to secure the another hinge plate to the first plate section via the third fastener opening in the another hinge plate such that the another hinge plate directly abuts the first plate section; and
    the second hinge fastener is configured to secure the another hinge plate to the second plate section via the fourth fastener opening in the another hinge plate such that the another hinge plate directly abuts the second plate section.

18. The swage machine of claim 15, wherein the second fastener is also configured to secure the hinge plate to the first plate section via the second fastener opening in the hinge plate such that the first plate section directly abuts the second plate section.

19. The swage machine of claim 15, wherein the first plate section comprises a third fastener opening and the second plate section comprises a fourth fastener opening, wherein:
    the first hinge fastener is configured to be secured in the first fastener opening in the hinge plate and the third fastener opening in the first plate section to facilitate securing the hinge plate to the first plate section; and the second hinge fastener is configured to be secured in the second fastener opening in the hinge plate and the fourth fastener opening in the second plate section to facilitate securing the hinge plate to the second plate section.

20. The swage machine of claim 15, comprising a swaging actuator secured to the die plate and the grab plate, wherein:

the die plate is configured to enable the set of die segments to be loaded in the swage machine such that the set of die segments opens toward the grab plate; and the swaging actuator is configured to facilitate moving the die plate over the portion of the pipe fitting in an axial direction toward the grab plate to enable the swage machine to conformally deform the portion of the pipe fitting around the tubing of the pipe segment using the set of die segments.

* * * * *